(12) United States Patent
Lawyer et al.

(10) Patent No.: US 9,166,811 B2
(45) Date of Patent: Oct. 20, 2015

(54) APPARATUS AND METHODS FOR CONTROLLING A HABITAT ENVIRONMENT

(75) Inventors: Justin Lawyer, Bethlehem, PA (US); Patrick Clasen, Bethlehem, PA (US); Timothy Marks, Bethlehem, PA (US)

(73) Assignee: Ecotech Marine, LLC, Allentown, PA (US)

( * ) Notice: Subject to any disclaimer, the term of this patent is extended or adjusted under 35 U.S.C. 154(b) by 488 days.

(21) Appl. No.: 13/296,774

(22) Filed: Nov. 15, 2011

(65) Prior Publication Data

US 2012/0143381 A1 Jun. 7, 2012

Related U.S. Application Data

(60) Provisional application No. 61/413,700, filed on Nov. 15, 2010, provisional application No. 61/454,757, filed on Mar. 21, 2011, provisional application No. 61/502,064, filed on Jun. 28, 2011.

(51) Int. Cl.
| | | |
|---|---|---|
| *G05B 15/02* | (2006.01) | |
| *H04L 12/28* | (2006.01) | |
| *H04L 12/66* | (2006.01) | |
| *A01K 63/00* | (2006.01) | |
| *A01K 63/02* | (2006.01) | |
| *H04L 12/24* | (2006.01) | |
| *H04L 29/06* | (2006.01) | |

(52) U.S. Cl.
CPC .......... *H04L 12/2816* (2013.01); *A01K 63/003* (2013.01); *A01K 63/02* (2013.01); *G05B 15/02* (2013.01); *H04L 12/2803* (2013.01); *H04L 12/66* (2013.01); *G05B 2219/25011* (2013.01); *G05B 2219/31434* (2013.01); *H04L 41/22* (2013.01); *H04L 69/26* (2013.01); *Y04S 20/242* (2013.01)

(58) Field of Classification Search
USPC ........ 210/85, 87, 97, 137, 169, 741; 700/282, 700/83
See application file for complete search history.

(56) References Cited

U.S. PATENT DOCUMENTS

| | | | |
|---|---|---|---|
| 3,892,199 A * | 7/1975 | Huyler | 119/260 |
| 4,773,008 A * | 9/1988 | Schroeder et al. | 700/90 |
| 4,888,703 A * | 12/1989 | Baba et al. | 702/22 |
| 6,537,213 B2 | 3/2003 | Dodds | |
| 6,748,898 B2 | 6/2004 | Ulman et al. | |
| 6,799,080 B1 * | 9/2004 | Hylden et al. | 700/97 |
| 6,805,074 B2 | 10/2004 | Newcomb et al. | |
| 7,222,047 B2 | 5/2007 | McMillan et al. | |
| 7,527,022 B2 | 5/2009 | Bonner et al. | |
| 7,913,566 B2 * | 3/2011 | Hedtke | 73/649 |
| 2002/0046254 A1 | 4/2002 | Khan et al. | |
| 2004/0123810 A1 | 7/2004 | Lorton et al. | |
| 2006/0212174 A1 * | 9/2006 | Garmon et al. | 700/276 |
| 2007/0106403 A1 * | 5/2007 | Emery et al. | 700/90 |

(Continued)

*Primary Examiner* — Darrin Dunn
(74) *Attorney, Agent, or Firm* — Berenato & White, LLC

(57) ABSTRACT

A system is provided for controlling an aquatic habitat. The system for includes a server, a bridge, and a habitat component. The server includes a database containing information associated with a habitat component. The server also includes a communication interface for transmitting operating data for the habitat component. The bridge has a first communication unit configured to communicate with the server communication interface and transmit the operating data received from the server to the habitat component. The habitat component has a second communication unit for receiving operating data from the bridge.

12 Claims, 5 Drawing Sheets

(56) References Cited

U.S. PATENT DOCUMENTS

| | | | |
|---|---|---|---|
| 2007/0251461 A1* | 11/2007 | Reichard et al. | 119/245 |
| 2007/0255116 A1* | 11/2007 | Mehta et al. | 600/300 |
| 2007/0255431 A1* | 11/2007 | Kinsey | 700/21 |
| 2007/0256643 A1 | 11/2007 | Coiro et al. | |
| 2007/0295277 A1 | 12/2007 | Kin et al. | |
| 2008/0147004 A1* | 6/2008 | Mann et al. | 604/131 |
| 2008/0282988 A1 | 11/2008 | Bloksberg | |
| 2009/0041054 A1 | 2/2009 | Das et al. | |
| 2009/0200245 A1 | 8/2009 | Steinbrueck et al. | |
| 2009/0292375 A1* | 11/2009 | Thompson et al. | 700/81 |
| 2009/0312853 A1* | 12/2009 | Kore et al. | 700/90 |
| 2010/0138007 A1* | 6/2010 | Clark et al. | 700/90 |
| 2010/0290359 A1* | 11/2010 | Dewey et al. | 370/252 |
| 2011/0052416 A1* | 3/2011 | Stiles | 417/42 |
| 2011/0093098 A1* | 4/2011 | Kostadinov et al. | 700/87 |
| 2011/0126775 A1 | 6/2011 | Seltzer et al. | |
| 2012/0022698 A1* | 1/2012 | Mackay | 700/275 |
| 2013/0073103 A1* | 3/2013 | Kao et al. | 700/291 |

\* cited by examiner

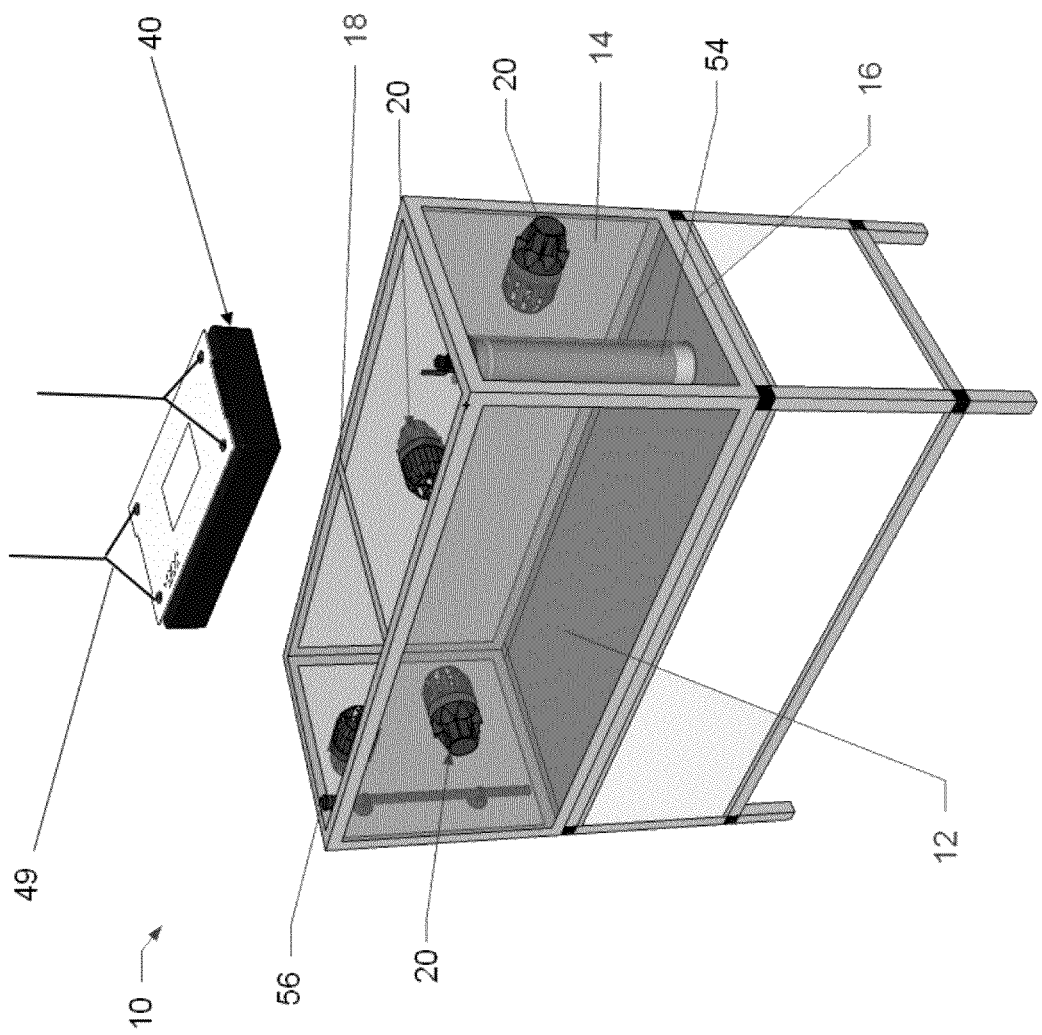

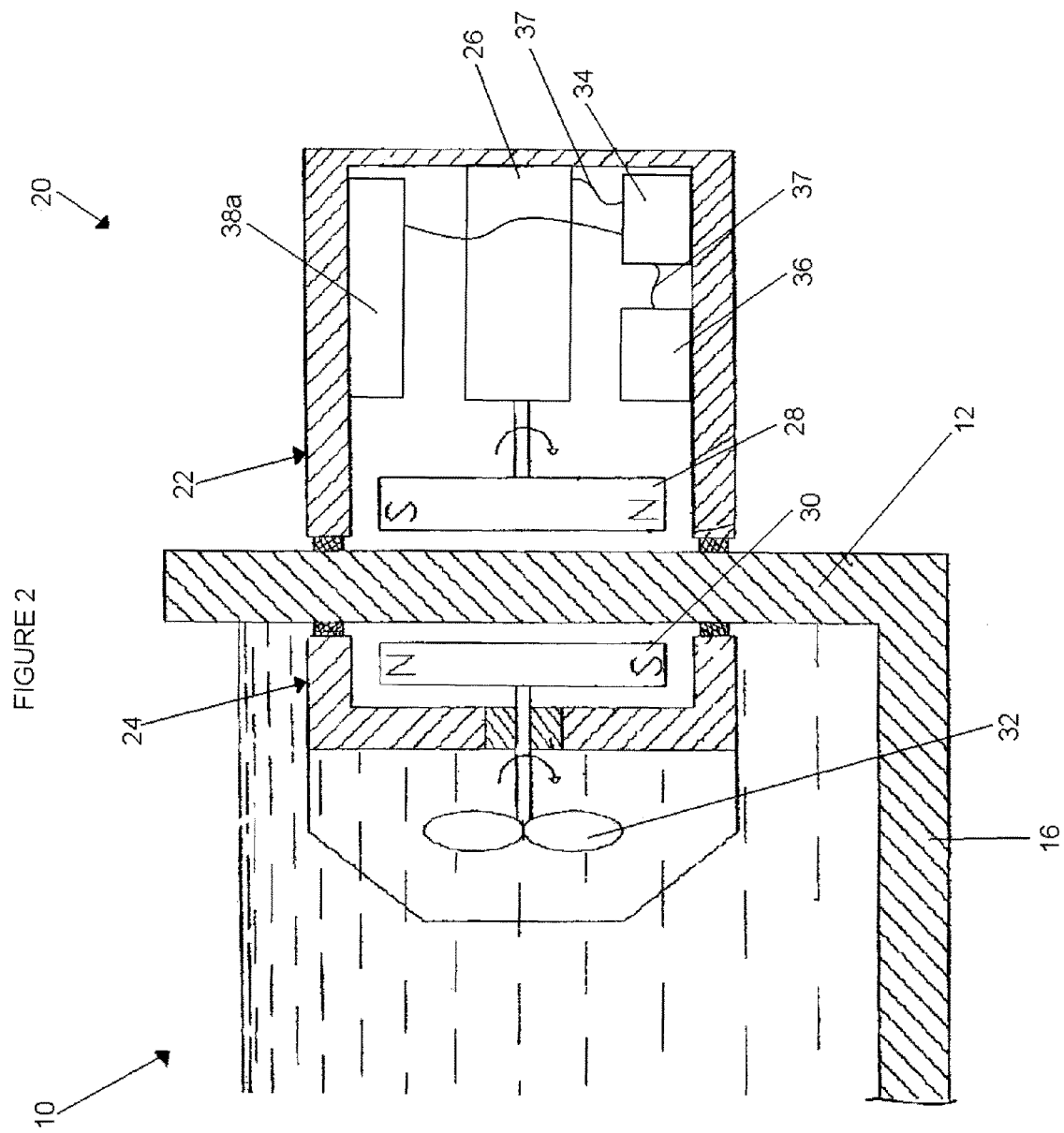

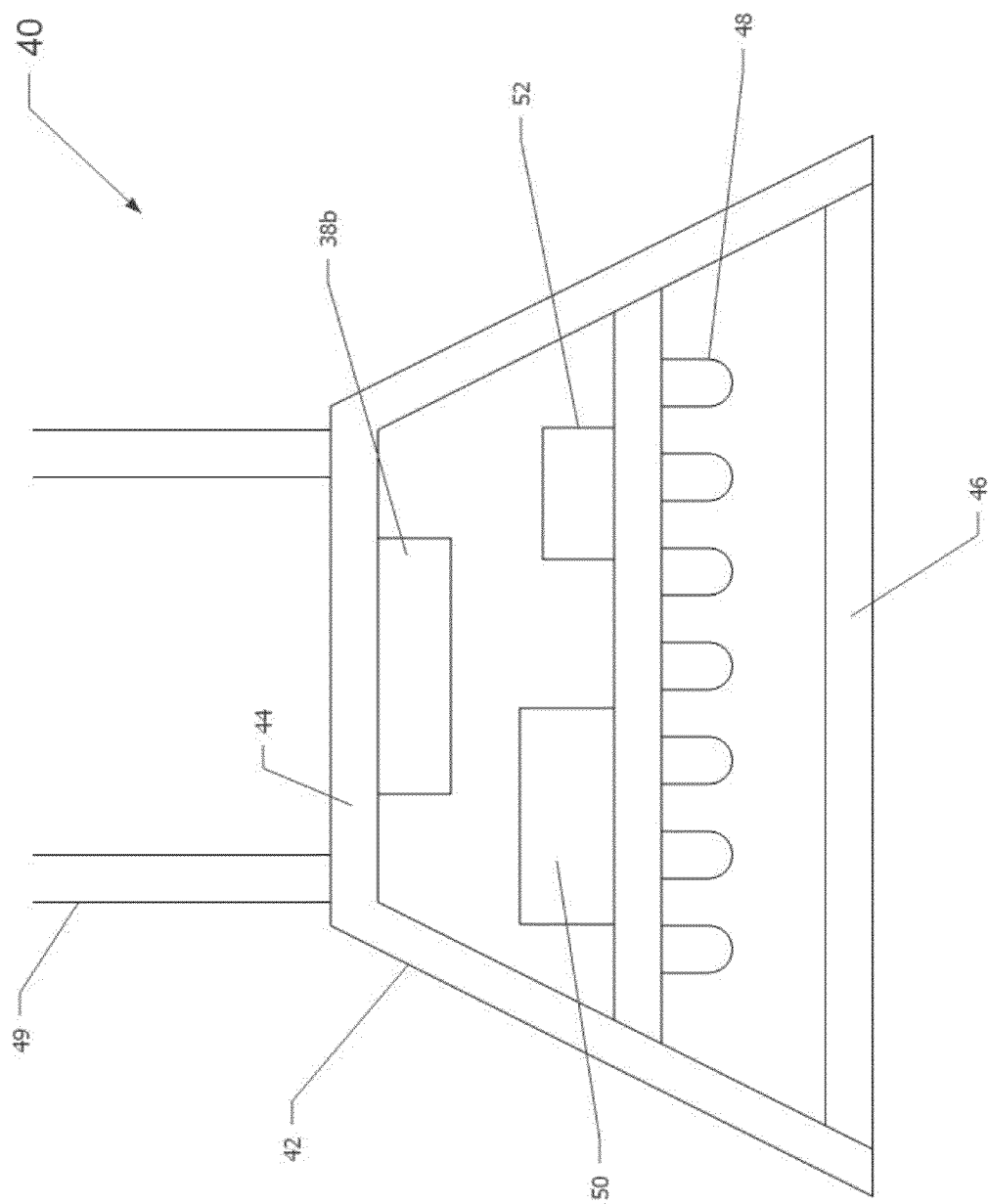

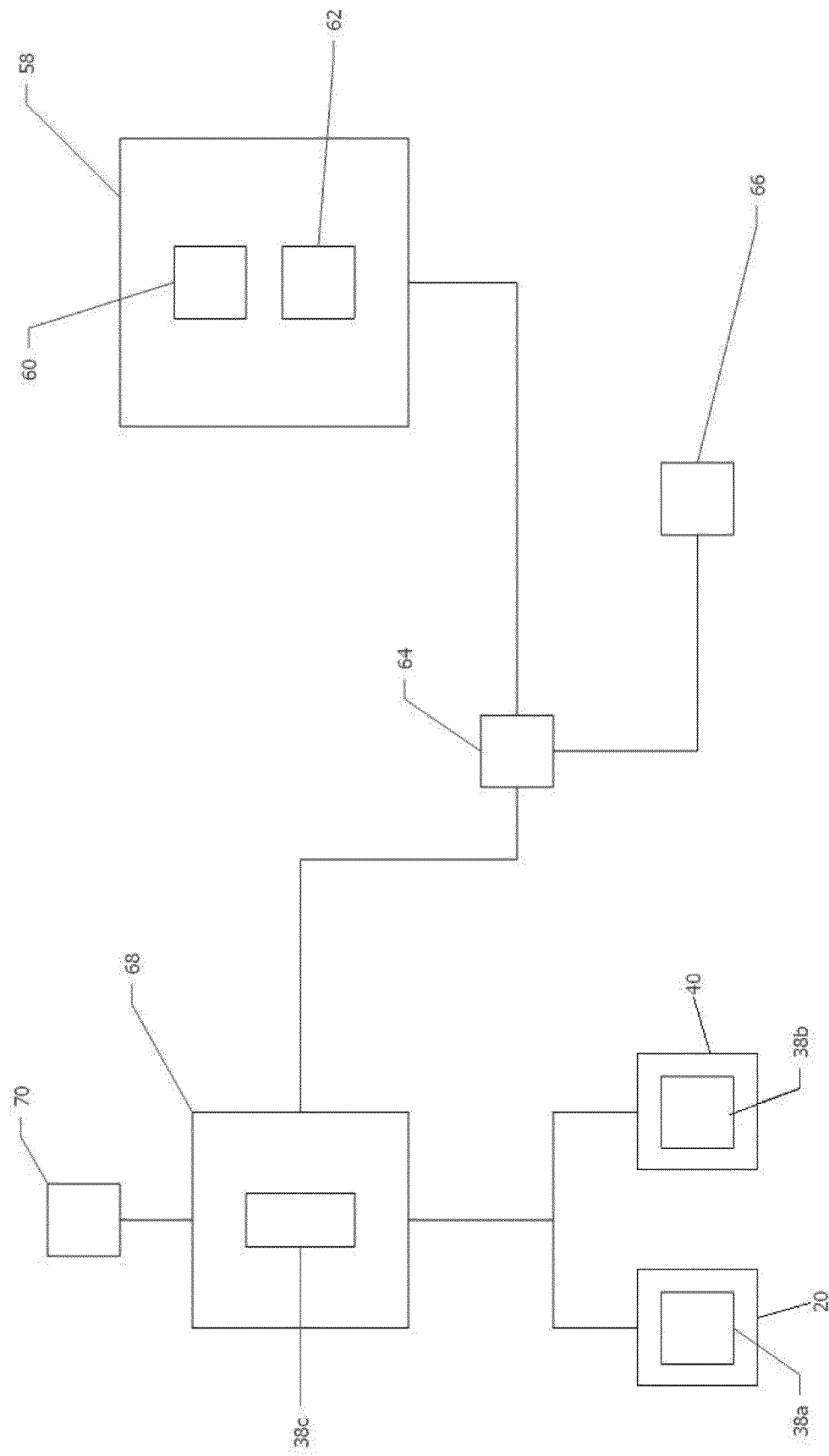

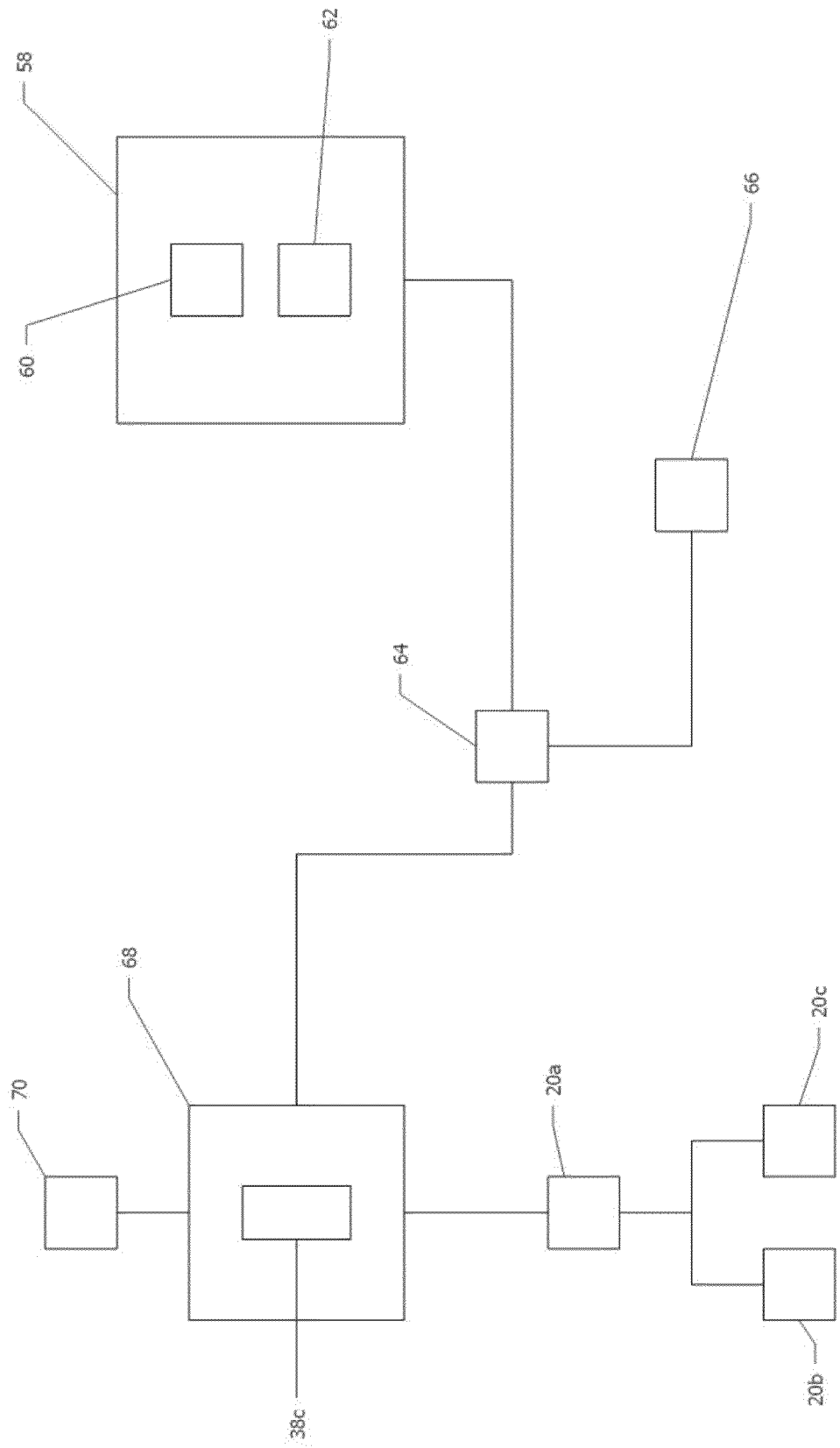

APPARATUS AND METHODS FOR CONTROLLING A HABITAT ENVIRONMENT

CROSS-REFERENCE TO RELATED APPLICATIONS AND CLAIM TO PRIORITY

This application is based on Provisional Application Ser. No. 61/413,700, filed on Nov. 15, 2010, Provisional Application Ser. No. 61/454,757, filed on Mar. 21, 2011, and Provisional Application Ser. No. 61/502,064 filed on Jun. 28, 2011, all of which are incorporated herein by reference and to which priority is claimed.

FIELD OF THE INVENTION

The present invention is directed to a habitat, components associated with the habitat, and controlling the various components associated with the habitat.

BACKGROUND

Habitats typically include a controlled environment, such as rooms or containers, that houses organisms, such as fish, invertebrates, amphibians, mammals, reptiles, plants, bacteria, or any combination thereof. These habitats require a high amount of care which includes maintaining specific environmental conditions, such as temperature, humidity, lighting type, lighting amount, salinity, pH, and flow control of air or water inside the habitat may need to be regulated depending on the organism living therein. The environmental conditions may be controlled by devices such as heaters, pumps, filters, fans, lighting systems, etc. While the combined effects of these devices are extremely important, the devices typically act independently of each other.

SUMMARY

In accordance with an embodiment, a system for controlling a habitat includes a server, a bridge, and a habitat component. The server includes a database containing information associated with a habitat component. The server also includes a communication interface for transmitting operating data for the habitat component. The bridge has a first communication unit configured to communicate with the server communication interface and transmit the operating data received from the server to the habitat component. The habitat component has a second communication unit for receiving operating data from the bridge.

In accordance with a further embodiment, a system for controlling an aquatic habitat includes a bridge and a pump. The bridge has a first communication unit configured to receive operating data from a user and transmit the received operating data to a component associated with a habitat. The pump is associated with the habitat and includes a second communication unit for receiving operating data from the bridge. The pump also includes a microprocessor for converting the operating data received from the bridge to produce an output to control the pump.

In accordance with another embodiment, a method of controlling a habitat is provided. The method includes inputting environmental information associated with a habitat to a user interface. The environmental information is transmitted from a user interface to a server. Operating data is prepared related to a first component and a second component associated with the habitat. The operating data for the first and second components is transmitted from the server to a bridge associated with the habitat. The operating data related to the first component is transmitted from the bridge to the first component. Operating data related to the second component is transferred from the bridge to the second component.

Other embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 1 is a perspective view of an aquatic habitat according to an exemplary embodiment of the invention.

FIG. 2 is a sectional schematic view of the pump assembly of the aquatic habitat of FIG. 1 according to an exemplary embodiment of the invention.

FIG. 3 is a sectional schematic view of the illumination assembly of the aquatic habitat of FIG. 1 according to an exemplary embodiment of the invention.

FIG. 4 is a schematic view of a habitat control system according to an exemplary embodiment of the invention FIG. 5 is a schematic view of a habitat control system according to an alternative exemplary embodiment of the invention.

DETAILED DESCRIPTION OF EXEMPLARY EMBODIMENT(S) AND EXEMPLARY METHOD(S)

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

In an exemplary embodiment, a system and method to control and synchronize devices associated with controlling the environmental conditions of a habitat 10 are provided. FIG. 1 depicts an aquatic habitat 10 that utilizes the exemplary system and methods described herein. Other embodiments may be used in connection with the growth and support of any type of organism habitat including terrariums, green houses, nurseries, Petri dishes, etc. The habitat 10 has a pair of side walls 12, a pair of end walls 14 connected to the side walls 12, a bottom 16, and an open top 18. Though depicted as having a standard rectangular shape, the habitat 10 may have a variety of sizes, shapes, and configurations and include any number of walls. The habitat 10 may be made from a variety of materials, including glass or acrylic.

Components, such as pumps, fans, filters, heaters, chillers, sensors, etc., may be attached or used in connection with the habitat 10 to alter, or control the environment therein. Depending on the organism(s) living in the habitat 10, different components or combinations thereof will be appropriate. As illustrated in FIG. 1, the habitat 10 includes a set of pumps 20. A single pump 20 is associated with each of the side walls 12 and end walls 14. The pumps 20 may vary in number, size, type, and operating characteristic. In the exemplary embodiment shown in FIGS. 1 and 2, the pumps 20 are magnetically coupled pumps such as disclosed in U.S. Pat. No. 7,393,188, the disclosure of which is incorporated by reference which may be releasably or permanently secured to any of the walls 12, 14 of the habitat 10. The pumps 20 may be controlled through various methods, exemplary embodiments of which are discussed in further detail below.

As best shown in FIG. 2, the pumps 20 have a dry-side housing 22 and a wet-side housing 24. The housings 22, 24 may be made from any suitable material, such as a polymer material formed via a molding or extrusion process. The dry-side housing 22 includes a motor 26 connected to a magnet 28. The motor 26 may be electric, hydraulic, pneumatic, etc. In an exemplary embodiment, the motor 26 is a variable speed electric motor operating on either AC or DC. The magnet 28 may be a circular disc having at least one pair of magnetic poles N and S. The poles N, S may be arrayed in a radial pattern around the magnet 28. The magnet 28 may be made from a variety of magnetic materials including neodymium or other high performance magnetic materials. It should be understood that the magnet 28 may be configured differently, e.g. as an elongated bar or bars.

The wet-side housing 24 includes a magnet 30 connected via a shaft to a blade 32. The blade 32 may be an impeller or propeller type. The wet-side housing 24 may be placed in the habitat 10 and magnetically coupled to the dry-side housing 22 located outside of the habitat 10. As the motor 26 operates it turns the dry-side magnet 28 which turns the wet-side magnet 30 and the propeller 32. The magnetic attraction between the magnets 28, 30 should be sufficiently strong so that the wet-side housing 24 is held in place in the habitat 10 with enough force to prevent the wet-side housing 24 from being dislodged due to liquid circulation or slight contact. For example, the net magnetic attraction between the dry-side housing 22 and the wet-side housing 24 may be at least 1.0 pound; however, this may vary depending on the size of the pump 20 and the operating environment. Additionally, a variety of frictional elements or cooperating projections and depressions may be included on either of the housings 22, 24 or the habitat 10. Though not necessary, additional mechanical and/or chemical holding means can be included to attach the housings 22, 24 to the habitat 10.

The motor 26 is connected, either directly or indirectly, to a driver 34, a power supply 36, and a communication unit 38a. As best shown in FIG. 2, the power supply 36 and the communication unit 38a are connected to a driver 34 via electrical connections 37. The driver 34 is also electrically connected to the motor 26. The term "driver" as used herein may mean any type or combination of driver, controller, or microcontroller as well as any additional hardware or software components associated with controlling the operation of motor 26. As shown, the power supply 36 is DC battery powered, though AC outlet power may also be used. The driver 34 varies the amount of power supplied to the motor 26 to control the rotational speed of the shaft 21. As discussed above, the dry-side magnet 28 is magnetically coupled to the wet-side magnet 30 which is connected via the shaft 25 to the blade 32. Thus, by varying the power supplied to the motor 26, the driver 34 varies the amount and direction of fluid flow through the pumps 20. This creates different effects as described in further detail below.

The communication unit 38a may be placed on the inside or outside of the dry-side housing 22. The communication unit 38a may be a wireless communication module, such as a Wi-Fi module or a radio module. The communication unit 38a receives information and operating data from a source. The operating data may be processed by a microprocessor to control the pump 20. The microprocessor may be part of the communication unit 38a, part of the driver 34, or a part of a separate, but electrically connected circuit. For example, the microprocessor may relay commands to the driver 34. The communication unit 38a may communicate with other components in the habitat 10 and/or a bridge 68, as shown in FIG. 4 and described in greater detail below. The communication unit 38a may also communicate with a local user interface. While the communication unit 38a, the driver 34, and the motor 26 are depicted in FIG. 2 as separate units, they may be consolidated into a single unit or any combination or variation thereof.

As best shown in FIGS. 1 and 3, a lighting unit 40 can be suspended or otherwise mounted or positioned above the habitat 10. The lighting unit 40 includes a housing 42 having a top 44 and a transparent bottom 46. The interior of the housing 42 is shown containing a plurality of light emitters 48 although only a single light emitter may be used. A suspension assembly 49 suspends the lighting unit 40 above the habitat 10. In various exemplary embodiments, the suspension assembly 49 may include supports, brackets, posts, struts, legs, clips, or additional mechanical components which attach the lighting unit 40 to a ceiling, wall, or to a component of the habitat 10, such as the side walls 12, end walls 14, bottom 16, or top 18.

The light emitters 48 may be capable of emitting light in a variety of colors and at various intensities. In an exemplary embodiment, the light emitters 48 may be light emitting diodes (LEDs), for example organic or non-organic LEDs. As best shown in FIG. 3, the light emitters 48 are connected to a driver 50 or other similar control circuit. The driver 50 is connected to a power supply 52. A communication unit 38b may be connected to the driver 50 as well as to various other components of the lighting unit 40. The power supply 52 may be an AC source, such as a standard outlet, or a DC source, such as a battery or solar power. In an exemplary embodiment, the power supply 52 and the communication unit 38b are electrically connected to the driver 50, and the driver 50 is electrically connected to the light emitters 48. While the communication unit 38b, driver 50, and power supply 52 are depicted in FIG. 3 as separate units, they may be combined into a single unit or any combination or variation thereof.

The driver 50 provides on/off capability and also adjusts the amount of power supplied to each light emitter 48 or to a group of light emitters 48 so that the color and intensity of the emitted light can be varied to create different effects. If the light emitters 48 emit different color light, certain emitters 48 may be activated and others deactivated to control the light color output. In an exemplary embodiment, groups of light emitters 48 will have a range of wavelengths that is different or only slightly overlaps with other groups of light emitters 48. For example, light emitters 48 may be separated into different color groups of white, red, green, blue, and royal blue. The wavelength of the light emitters 48 of each group may be varied to produce different shades and intensities of each color. Each color group may be on a single channel, so that the light emitters 48 are group controlled by the driver 50 as opposed to individually controlled.

FIG. 3 shows a single group of light emitters 48. Multiple groups, comprising different amounts, sizes, and types of light emitters 48 may be contained in the housing 42. Each group of light emitters 48 may have a dedicated driver 50 or multiple groups of light emitters 48 may be controlled by a single driver 50.

The communication unit 38b is similar to communication unit 38a described above. The communication unit 38b may be a wireless communication module, such as a Wi-Fi module, a radio module, or a combination of both. The communications units 38a, 38 is not necessarily wireless. The communication unit 38b receives operating data. The operating data may be processed by a microprocessor to control the lighting unit 40. The microprocessor may be part of the communication unit 38b, part of the driver 50, or a part of a separate, but electrically connected circuit. For example, the microprocessor may relay commands to the driver 50. The communication unit 38b may also communicate with other components of the habitat 10 and the bridge 68 as described in greater detail below. The received operating data may instruct the driver 50 to vary or modify power supplied to the light emitters 48 to produce different lighting effects. Some of these effects are discussed in greater detail below, but it should be noted that a wide variety of lighting effects may be achieved.

As depicted in FIG. 1, other components such as a filter 54 and a heating/cooling unit 56 may be utilized with the habitat 10. Although not shown, each component may contain a corresponding driver, power source, communication unit, microprocessor, or any combination thereof. The filter 54 may be a mechanical, chemical, or biological-type filter. As with the pumps 20, more than one filter 54, heating/cooling unit 56, etc. may be used depending on the requirements of the habitat 10.

Though not depicted in the Figures, various exemplary embodiments may utilize sensors to monitor the habitat 10 and additional components for altering and controlling the environment. Sensors may monitor, for example, temperature at specific points in the habitat, including air and water temperature, water level, air and water flow, pH, salinity, moisture level, and humidity. Similarly, components to alter and control the environmental conditions properties, such as heaters, fans, pH adjusters, humidifiers, and water changers or watering systems may be monitored and controlled. Other sensors and components may be incorporated as will be understood by one of ordinary skill in the art.

In an exemplary embodiment, a system for integrating and controlling various components associated with the habitat 10 is provided. FIG. 4 depicts a schematic of an exemplary system including a server 58. The server 58 may be a centralized server, or it may be information stored across a network, or other devices. The server 58 includes a database 60 for storing information related to a user, the habitat 10, and to different components associated with that habitat 10. The server 58 may have software, such as a computer program or a plurality of computer programs, for receiving, organizing, and storing the information related to the habitat 10. The server 58 also includes a communication interface 62. The communication interface 62 is capable of communicating with a user interface 66 and a bridge 68. In an exemplary embodiment, communication between the communication interface 62 and the user interface 66 is provided through the Internet 64. The user interface 66 may be a software program for example a computer program, web application, web form, Java application, mobile application, or other suitable program running on a computer, smart phone, remote, or other suitable electronic device. Various applications and software associated with individual devices for allowing the user to send and/or receive information and commands to the server 58 via user interface 66 will be understood by one of ordinary skill in the art upon viewing this disclosure. As shown in FIG. 5, the user interface 66 may be separate from the server 58, for example stored on a user's electronic device. The user interface 66 may also be store, hosted, or otherwise associated with the server 58.

In an exemplary embodiment the user interface 66 allows a user to convey and receive various information relating to the habitat 10 and its components, as well as provide operating data to the components of the habitat 10. A user inputs information about the habitat 10, for example the shape of the habitat 10 as well as information relating to the contents of the habitat 10. A user also inputs information relating to the type and number of components associated with the habitat. For example, with the habitat 10 shown in FIG. 1, a user enters that there are four pumps 20, and specifies the identification, location and type of each pump 20. The user can also enter the type of lighting unit 40, filter 54, heating/cooling unit 56, and any other components. The information about the habitat 10 and each component is entered into the user interface 66, for example it may be typed into a field or selected from a list or menu. The "user" may be the owner of the aquarium, a technician, or any other type of operator and is not limited to a specific or single person.

After the specifications for the habitat 10 are established, the user enters information relating to the control of the components. For example, the user can enter information controlling the speed of individual pumps 20 to create different operational modes. Operational modes may be created by the user or may be selected from a predetermined list. The list may be generated automatically, for example by the server 58 or user interface 66, based on the number and type of components entered into the system. Automatically generated operational modes may also be based on the specifics of the habitat 10. Examples of operational modes that may be associated with an aquatic habitat include:

Constant Speed Mode—Pumps 20 run continuously at a constant speed which can be set by the user;

Nutrient Transport Mode (NTM)—A multi-phase program to promote maximum health and nutrient export, as well as increased growth for corals which alternates between a resonant standing wave and a surge effect to stir up and export nutrients;

Tidal Swell Mode (TSM)—Creates a harmonic balance reminiscent of the changing flow conditions that would be found in nature. Flow varies from side to side, calm, and ends with a surge;

Reef Crest Random Mode—Simulates the high-energy conditions of a natural reef crest environment, for example by operating the pumps at a high or moderate power and wave conditions;

Lagoonal Random Mode—Simulates the gentler reef zone found in a natural lagoon by operating the pumps at a lower power;

Short Pulse Mode—Controls the pumps to allow for wave pulse timings of two seconds or less, enabling the creation of FAST alternating flow throughout the tank. This mode may be used to create a resonant standing wave;

Long Pulse Mode—Controls the pumps to allow for wave pulse timings of two seconds and greater, enabling the creation of slow alternating flow throughout the tank;

Feed Mode—Slows down pump to allow user or automatic device to feed aquarium. The user can select the duration and speed for Feed Mode;

Night Mode—Automatically reduce speed and operates continuously at that speed for a period of time during the night. The user can select the duration and speed for Night Mode, may include light settings imitating various phases of moonlight; and Battery Backup Mode—When used with a battery backup accessory, the pump 20 will switch to Battery Backup Mode in the event of a power outage and will operate at a user set speed to maximize battery life.

The user interface 66 allows a user to select different operational modes for individual pumps 20, or a general operating mode for the entire habitat 10. The user interface 66 may also allow a user to select different operational modes for different times. With the user interface 66, the user may enter commands instructing the lighting unit 40 to provide different color and intensity of light over a certain time interval, for example, to mimic a night-and-day cycle or to associate different lighting effects with the pump 20 operating modes described above. Utilizing a combination of these effects, a user can establish a profile for the individual components or the habitat 10 as a whole over a specific time period, for example a day, week, month, or year. The programming of components may also include, but is not limited to, real time or prescheduled control of various components including: setting the feed mode speed of pumps, changing flow modes of the pumps throughout the day; changing speeds of the pumps throughout the day; and turning on and off components throughout the day. Similarly, the user interface 66 can allow the user to enter commands controlling any other sensors or components associated with the habitat 10.

The information and commands entered into the user interface 66 are associated with an individual user profile saved in the database 60. The information may be organized or compiled by the server 58, for example through data integration techniques for combining and organizing multiple data sources, to be translated into different operating data forms as required by the system and the components. The operating data is then transmitted to a bridge 68 associated with the respective habitat 10. The bridge is capable of connecting the network formed by the habitat components to the server 58. The bridge 68 may also be capable of performing protocol conversion of the data. The data may be coded according to the individual component or components the data is associated with. The operating data may be transmitted as single packet. For example, operating data associated with multiple components may be sent in a single transmission to the bridge 68. In various exemplary embodiments, the bridge 68 may be configured to recognize and sort operating data for each individual component and transmit the appropriate data to the appropriate component. The bridge 68 may also transmit the entire packet of operating data to all components, and the components may be configured to determine which portion of the operating data to implement. In an alternative embodiment, the server 58 may transmit operating data associated with different components in separate, individual transmissions. The bridge 68 may then pass the operating data to the appropriate component. The bridge 68 may have various hardware and software to perform the operations described herein.

FIG. 4 shows the server 58 in communication with the user interface 66 and the bridge 68 through an Internet connection 64. It is to be understood that the server 58 may be connected to multiple user interfaces 66 and multiple bridges 68 associated with different habitats 10. The bridge 68 may be positioned at the habitat 10 or remote from the habitat 10. As best shown in FIG. 4, the bridge 68 is connected to the Internet 64 either wirelessly or through a hard line connection. The bridge 68 may have a housing which includes a communication unit 38*c*. The bridge 68 may also have a USB port to connect to a computer for setup and firmware updating or restoring, though these functions may also be performed through a wireless connection. Various other components such as a power supply, display screen, indicators, Ethernet input, wireless card, microprocessor, etc. may be associated with the bridge 68.

In an exemplary embodiment, the bridge 68 has controls, such as button, switches, etc., for set up, and an indicator, such as LEDs, a screen, etc., to allow a user to monitor the bridge 68 or any associated component. A communication unit 38*c* allows the bridge 68 to communicate with the communication units of the habitat components, for example the communication unit 38*a* of the pumps 20 and the communication unit 38*b* of the lighting unit 40. In various exemplary embodiments, the bridge 68 may have hardware and/or software to convert received data to be sent to the various components.

In an exemplary embodiment, upon connection to the server 58, the bridge 68 is recognized based on an Internet Protocol (IP) address and a corresponding profile is extracted from the database 60. The bridge 68 may also have a specific serial number or other identification which allows the server 58 to identify individual bridges 68 from one another. The bridge 68 may be in constant communication with the server 58, or it may automatically connect periodically to check for updates or additional programming.

As discussed above, the bridge 68 and individual components are connected via communication units 38*a*-38*c*. Communication may be accomplished wirelessly, for example through an RF module or Wi-Fi connection. In an exemplary embodiment, the bridge 68 is connected to the server 58 through a wireless connection and is connected to the communication units 38*a*, 38*b* of the components via an RF module. The individual components and the bridge 68 may have a button or other means of initiating a syncing procedure where the communication units 38*a*-38*c* of the components search for and sync with any other devices in range. Operating data is transmitted from the server 58 to the bridge 68 which relays the operating data to the communication unit(s) 38*a*-38*c* of one or more components as applicable.

The bridge 68 therefore passes information and, in this embodiment, does not control the individual components. While the individual components may receive information and commands from the server 58, the user interface 66, or a local device, the operation of the individual components is left up to the hardware and software contained in the individual component. The individual component receives and implements the operating data to produce a change in the environment or provide a monitoring operation. This allows the individual components to operate by receiving operating data from the with the bridge 68 or on their own in the absence of the bridge 68. This eliminates the need for a centralized controller which receives the instructions and operates each component.

In an exemplary embodiment, the components together create a wireless mesh network of devices. The components are therefore capable of transmitting and receiving information within the network as well as relaying information for other components. As discussed above, each component has its own communication unit 38*a*, 38*b* and may have its on microprocessor and internal memory. In an exemplary embodiment, the components include a universal asynchronous receiver/transmitter enabling them to translate data received from the bridge 68 or from other components.

The devices may be capable of receiving operating data and operating accordingly until new or updated operating data is received. For example a pump 20 may receive operating data instructing it to operate at a certain speed and will operate at that speed until instructed otherwise. The components may also be able to store a set of operating data containing operating information for a certain amount of time. In an exemplary embodiment, the components are capable of storing commands for operating over an hour, a day, a week, a month, a year, or more. The commands remain stored on the individual component until modified. For example, the pump 20 may receiving operating data instructing it to operate at a first speed between 7:00 am and 7:00 pm and operate at a second speed between 7:01 pm and 6:59 am. The pump will then operate at these two speeds each day during the set time intervals until new operating data is received. Updated operating data may be sent to the components every day, week, month, etc. as needed, enabling the components to automatically operate in a different pattern over a set period of time. In another example, a lighting unit 40 may contain a monthly set of instructions allowing the lighting unit 40 to not only operate on a night and day cycle, but to vary the night cycle in phase with a typical lunar phase. The day and night periods over a certain time span may also be varied to allow for an adjustment in the amount of daylight corresponding to a certain time and region. These features and capabilities allow the habitat 10 to operate in a more realistic manner. In order to follow the appropriate time cycles, the lighting unit 40, as well as the other components may contain timing units (not shown), for example a timing circuit or similar device.

The bridge 68 may be provided with internal memory for storing received operating data. The stored operating data may be the most recent or updated operating data received from the server 58 or those input by a user. The bridge 68 may also be capable of storing operating data for a set amount of time, for example a day, week, month, or year. The stored operating data may then be relayed to the components at specific intervals. In an exemplary embodiment, the bridge 68 may have more data points for storing operating data than the components. This enables the components to operate as desired over a time interval greater than they would be individually capable if communication is lost with the server 58 or updates are not provided by a user. For example, the components may contain data points suitable for retaining operating data representing a day of operation and the bridge 68 may contain data points suitable for retaining operating data representing a month of operating instructions.

Individual components, for example the lighting unit 40, and the bridge 68 may be provided with an input panel (not shown) allowing the user to directly input operating data to each component. For example the input panel may contain associated switches such as capacitive sensing devices, pressure sensing devices, processors, piezoelectric devices, or any combination thereof. The input panel may also relay information to the user, for example through LED lights or panels. The electrical components may vary depending on the functions of the input panel. In various exemplary embodiments, piezoelectric devices may be associated with the input panel and configured to emit vibrations to alert the user that a button has been pressed, that there is an error in the programming input, and/or to communicate any number of instructions or status information to a user.

The input panel may also be programmed so that different gestures or combinations of activated buttons select a specific operating mode or perform a certain set of instructions. Gestures may include swiping a finger across all or a limited number of buttons on the input panel in a single direction or in any combination of directions. For example, the input panel may include capacitive sensors and be programmed so that when a user swipes a finger across the input panel from left to right the pumps 20 and the lighting unit 40 go into a certain operational mode, such as sunrise mode.

Individual components and the bridge 68 may also connect directly to a local device 70, which allows the user to interact with the bridge 68 without going through the server unit 58. The local device 70 may be capable of accessing or running software similar or identical to the user interface 66 or it may be a designated electronic device such as a remote control. The local device 70 may connect to the individual components and the bridge 68 through a USB connection. The local device 70 may include any one or combination of the following features: a control to adjust or set different settings in each operation mode; a control to select different operational modes; indicators, such as a screen or LED indicator lights, to signal different modes, speeds, time, etc.; a control to select different options in certain configuration modes associated with a component; a power switch; a control dial used to select different options and to change levels, such as pump speed or light intensity; a wireless signal strength or connection indicator; a cable interface for connecting directly to the bridge 68; a power input; and a battery backup input.

The local device 70 may be configured to connect and/or communicate with any of the components of the habitat 10 as well as the bridge 68. In an exemplary embodiment, a single local device 70 includes the required hardware and software to communicate with the bridge 68, the pumps 20, the lighting unit 40, as well as any other components utilized for the habitat 10. For example, the local device 70 is capable of recognizing specific components, and providing different options to the user for controlling the components. Any changes or updates provided by the user through the local device 70 may be transmitted back to the server 58, for example via the bridge 68, and stored in the user's profile in the database 60.

Firmware associated with the bridge 68 and other components may be updated automatically without action on part of the user. For example, the server 58 may transmit update information to the bridge 68 which downloads the information and sends it to the components, such as the pumps 20, as required.

As discussed above, various components or dedicated sensors may monitor the habitat 10. Information from the sensors, as well as operating information for individual components may be relayed back to the bridge 68. The bridge 68 may then transmit this information to the user, either through the server 58, directly to the user interface 66, the local device, or any combination thereof. In an exemplary embodiment, the bridge 68 is configured to organize and compile the received data, for example through data integration methods. This enables a user to monitor the settings and operating status of components and the habitat 10 remotely at any time.

After data is transmitted to the server 58, the server 58 may organize and store information related to each habitat 10 in a historical collection as part of the database 60. The information may be updated regularly at a set interval or an interval determined by the user. Historical data may be compiled into a graphic representation, such as a graph or chart, based on the individual components or the system as a whole. The historical data may be used to identify inefficiencies or a possible failure of components.

Based on the information received from the habitat 10, a user may make adjustments as needed. These adjustments may be made locally on the component or remotely, through the server 58 or the bridge 68. For example, if the temperature of the habitat 10 becomes too high, a user may select to turn off the lighting unit 40 or to turn on a fan. Additionally, if power is lost to the bridge 68 or any of the other components, an alert may be triggered and sent to the user. A power failure may be determined, for example, by disruption of communication between the server 58 and the bridge 68. The alert may be sent to the user via email, text message, phone call, or other form of personal or electronic communication.

A user may also establish normal operating parameters in a respective profile stored in the database 60. The monitoring information may then be received by the server 58 and compared to values or a range of values established by the user. If the server 58 determines that the received monitoring information is outside of the set parameters, it sends commands to the related component via the bridge 68 causing the component to make a desired adjustment in the environment. For example, if utilized with a green house habitat, the monitoring information may include temperature, humidity, and soil moisture level. If the soil moisture drops below a certain rate, the server 58 may transmit operating data to the bridge 68 to be passed to an automatic watering system, such as a drip hose or sprinklers. Upon receiving the instructions, the watering system turns on for a certain period of time.

While the bridge 68 is discussed as a separate unit, in various exemplary embodiments the bridge 68 may be incorporated into any of the components. For example, the pump communication unit 38a of one of the pumps 20 may contain the necessary hardware and/or software components to transmit operating instruction to other pumps 20 and receive related monitoring information, such as flow rate, and transmit this information back to the server 58. Similarly, a light communication unit 38b may act as a bridge 68 for other lighting units 40. This may be useful for large habitats 10 employing a large number of components or for a single bridge 68 being used to control multiple habitats 10.

A similar yet alternative setup may also be utilized in connection with an individual bridge 68. As best shown in the alternative embodiment of FIG. 5, a bridge 68 may send operating data to a main pump 20a. The main pump 20a may then provide operating instructions to dependent pumps 20b, 20c. Pumps 20a-20c may be the same as pumps 20. For example, the bridge 68 may send a communication to the main pump 20a instructing it to operate at 80% power, which may be based on a particular operating mode or a desired user preference as discussed above. The bridge 68 may send commands for the additional dependent pumps 20b, 20c which are communicated by the main pump 20a to the dependent pumps 20b, 20c. In an exemplary embodiment, the bridge 68 may be connected to the main pump 20a through a WiFi connection and the dependent pumps 20b, 20c may be connected to the main pump 20a through an RF module connection. Alternatively, the bridge may be connected to the main pump 20a through an RF module and the main pump 20a is separately connected to the dependent pumps 20b, 20c, though other forms of connections may also be used. Additionally, the bridge 68a may send operating parameters for the main pump 20a only. The dependent pumps 20b, 20c may monitor or be in communication with the main pump 20a, and base their operating parameters off those of the main pump 20a. For example, the dependent pumps 20b, 20c may determine that the main pump 20a is operating at 80% power and in turn operate at 80% power or some proportion thereof, depending on the configuration of the dependent pumps 20b, 20c. Similarly, the dependent pumps 20b, 20c may be able to determine that the main pump 20a is operating under a specific mode, and adjust their operating parameters in connection with this mode. Though pumps 20 are discussed, the same setup can be used for any type of component. Any number of component groups may be established and the method of controlling each component or each group varied. Accordingly, any variety of the controlling methods and any combination of such methods may be utilized to create a diversely customizable habitat 10.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed:

1. A method of controlling an aquatic habitat comprising:
providing a system for controlling a habitat comprising:
a habitat environment comprising a pair of sidewalls, a pair of end walls, and a bottom wall, wherein the habitat environment is made of a transparent material;
a user interface configured to receive an indication of a habitat specification, wherein the habitat specification comprises at least one of a shape of the habitat, a content of the habitat, a type of component within the habitat, and a number of components within the habitat;
a server comprising a database containing information associated with a habitat component and a communication interface for transmitting operating data for the habitat component, wherein the server is configured to receive the indication of the habitat specification from the user interface and wherein the operating data is generated based on the indication of the habitat specification and the information associated with the habitat component;
a bridge having a first communication unit configured to communicate with the server communication interface and transmit the operating data received from the server to the habitat component; and
the habitat component having a second communication unit for receiving the operating data from the bridge, wherein the habitat component is coupled to one sidewall or end wall such that the second communication unit is disposed outside the one sidewall or one end wall and is controlled based on the operating data, wherein the habitat component comprises a first component and a second component;
inputting environmental information associated with the habitat to the user interface, wherein the environmental information comprises at least one of a shape of the habitat, a content of the habitat, a type of component within the habitat, and a number of components within the habitat;
transmitting the environmental information from the user interface to the server;
preparing at the server operating data related to the first component and the second component associated with the habitat based on the environmental information and habitat environmental information stored at the server;
transmitting the operating data related to the first and second components from the server to the bridge;
transmitting the operating data related to the first component from the bridge to the first component, wherein the operating data related to the first component transmitted to the first component includes instructions to operate at a first operational mode during a first time period and a second operational mode different from the first operational mode during a second time period; and transmitting the operating data related to the second component from the bridge to the second component, wherein the first component is controlled to operate at the first operational mode during the first time period and the second operational mode during a second time period and the second component is controlled based on the operating data related to the second component transmitted from the bridge to the second component.

2. The method of claim 1, further comprising inputting a desired operating mode at the user interface wherein the operating data related to the first component and the second component prepared based on the desired operating mode, the environmental information, and the habitat environmental information stored at the server.

3. The method of claim 1, wherein the environmental information further includes an indication of a change in the environment of the habitat at a specific time.

4. The method of claim 1, further comprising monitoring individual components of the aquatic habitat and transmitting data relating to the operation of the individual components to the server.

5. The method of claim 1, further comprising storing operating data in the bridge.

6. The method of claim 1, wherein the bridge, the first component, and the second component are organized into a mesh network.

7. The method of claim 1, wherein the first component is a lighting unit and the operating data related to the first component includes instructions to operate on a day and night cycle.

8. The method of claim 1, further comprising:
generating at the server a plurality of operational modes based on the environmental information received from the user interface and the habitat environmental information stored at the server;

transmitting an indication of the plurality of operational modes from the server to the user interface;

receiving at the server an indication from the user interface based on an operational mode selected at the user interface, wherein the operating data related to the first component and the second component is prepared after receiving the indication from the user interface.

9. The method of claim 8, further comprising:
storing the environmental information associated with the habitat, the indication received from the user interface based on the operational mode selected at the user interface, and the operating data related to the first component and the second component within a user profile at the server.

10. The method of claim 9, further comprising:
receiving at the bridge an indication that an operational change was made at the first component or the second component;

transmitting from the bridge to the server the operational change made at the first component or the second component; and storing at the server the operational change made at the first component or the second component within the user profile.

11. The method of claim 1, wherein the first component and the second component continue to operate based on the operating data until further operating data is received.

12. The method of claim 1, wherein the operating data related to the first component is transmitted to the second component and the operating data related to the second component is transmitted to the first component and where the first component is controlled to operate based on the operating data related to the first component and the second component is controlled to operate based on the operating data related to the second component.

* * * * *